(12) United States Patent
Shuler et al.

(10) Patent No.: US 7,234,941 B2
(45) Date of Patent: Jun. 26, 2007

(54) TOY FOR USE WITH VERTICAL SURFACES

(75) Inventors: Eric T. Shuler, Piedmont, CA (US); Jorge Soto, Antioch, CA (US)

(73) Assignee: LeapFrog Enterprises, Inc., Emeryville, GA (US)

( * ) Notice: Subject to any disclaimer, the term of this patent is extended or adjusted under 35 U.S.C. 154(b) by 137 days.

(21) Appl. No.: 10/699,445

(22) Filed: Oct. 30, 2003

(65) Prior Publication Data

US 2005/0064372 A1    Mar. 24, 2005

Related U.S. Application Data

(60) Provisional application No. 60/505,980, filed on Sep. 24, 2003.

(51) Int. Cl.
*G09B 5/00* (2006.01)
(52) U.S. Cl. .................. 434/169; 434/201; 434/159; 434/167
(58) Field of Classification Search ............... 434/156, 434/157, 159, 167, 169, 178, 185, 307, 308, 434/317, 201, 259, 322, 323, 327, 334, 337, 434/340, 350, 362, 365; 446/143, 227, 397
See application file for complete search history.

(56) References Cited

U.S. PATENT DOCUMENTS

| | | |
|---|---|---|
| 4,968,255 A | 11/1990 | Lee et al. |
| 4,986,780 A | 1/1991 | Sougawa |
| 5,188,533 A | 2/1993 | Wood |
| 5,224,895 A | 7/1993 | Franz |
| 5,328,373 A | 7/1994 | Wood |
| 5,349,129 A * | 9/1994 | Wisniewski et al. .......... 84/600 |
| 5,372,511 A | 12/1994 | Cheung |
| 5,511,980 A | 4/1996 | Wood |
| 5,533,902 A * | 7/1996 | Miller ........................ 434/112 |
| 5,813,861 A | 9/1998 | Wood |
| 5,823,782 A * | 10/1998 | Marcus et al. .............. 434/156 |
| 5,944,533 A | 8/1999 | Wood |
| 5,997,304 A | 12/1999 | Wood |
| 6,146,146 A * | 11/2000 | Koby-Olson ................. 434/159 |
| 6,190,175 B1 * | 2/2001 | Pridgen ..................... 434/169 |
| 6,302,363 B1 | 10/2001 | Olson et al. |
| 6,464,503 B1 * | 10/2002 | Heit et al. ................... 434/156 |
| 6,608,618 B2 | 8/2003 | Wood et al. |
| 6,641,401 B2 | 11/2003 | Wood et al. |
| 6,726,485 B2 * | 4/2004 | Marcus et al. .............. 434/156 |
| 6,739,874 B2 * | 5/2004 | Marcus et al. .............. 434/156 |
| 6,755,655 B2 * | 6/2004 | Marcus et al. .............. 434/156 |

* cited by examiner

*Primary Examiner*—Dmitry Suhol (57) ABSTRACT

An interactive educational apparatus is described. The educational toy apparatus includes an indicium containing structure and a base unit capable of being vertically attached to a vertical surface such as a refrigerator door. The indicium containing structure is capable of being attached to the base unit so that the indicium containing structure and the base unit are vertically oriented.

47 Claims, 8 Drawing Sheets

TOY FOR USE WITH VERTICAL SURFACES

CROSS-REFERENCE TO RELATED APPLICATIONS

This non-provisional patent application claims the benefit of the filing date of U.S. Provisional Patent Application No. 60/505,980, filed Sep. 24, 2003, entitled "Interactive Educational Apparatus For Use With Vertical Surfaces". This U.S. Provisional Patent Application is herein incorporated by reference in its entirety for all purposes.

BACKGROUND OF THE INVENTION

There are a number of educational toys that have been described in the literature. For example, one such educational toy is described in U.S. Pat. No. 4,986,780. In this patent, a number of blocks with indicia are described. Each block includes a voice synthesizer and speaker so that when a child touches a block, the name of the letter on the block sounds.

While a toy such as the one described in U.S. Pat. No. 4,986,780 may be suitable for some purposes, a number of improvements could be made. A child's toys are often located in the child's bedroom or playroom in a dwelling, while the child's caregiver is working in the kitchen. The kitchen is typically the most frequented part of a dwelling. The kitchen is where food is prepared, the family eats its meals, snacks are eaten, and dishes are washed. If the child is a toddler, a caregiver will often want the child to be in the same room as the caregiver so that the child can be supervised. Thus, if the child is in the kitchen with the caregiver, the child will often be without his or her toys. The caregiver may not want the child to bring toys into the kitchen, since this may produce clutter the kitchen. Second, each block in the above-described U.S. patent includes a speech chip and other circuitry. Providing a speech chip in each block can be quite costly and could be impractical for children's toys.

In addition to the educational toys described above, there are a number of commercially available refrigerator magnets that have specialized indicia such as letters. However, such refrigerator magnets are not interactive or fun and are essentially no better than pictures of numbers or letters that might be depicted on a piece of paper.

It would be useful to provide for an educational toy that can be used in the kitchen, that does not clutter the kitchen, and that provides for fun and interactive learning in a place where a child's caregiver and the child spend a significant amount of time. It would also be desirable to accomplish these objectives in a cost effective manner.

Embodiments of the invention address these and other problems.

SUMMARY OF THE INVENTION

Embodiments of the invention are directed to interactive educational toy apparatuses, and methods of using such interactive educational toy apparatuses.

One embodiment of the invention is directed to an interactive educational toy apparatus comprising: (a) an indicium containing structure including an indicium and a first attachment element; and (b) a base unit capable of being attached to a vertical surface, wherein the base unit includes (i) a housing, (ii) a receiving region adapted to receive the indicium containing structure, (iii) a processor unit in the housing, (iv) a speaker coupled to the processor unit, (v) a reader coupled to the processor unit, and (vi) a second attachment element coupled to the housing, wherein the indicium containing structure is capable of being attached to the base unit using the first attachment element and the base unit is capable of being attached to the vertical surface using the second attachment element.

Another embodiment of the invention is directed to a method of using an interactive educational toy apparatus comprising: (a) attaching a base unit on a vertical surface, wherein the base unit includes (i) a housing, (ii) a processor unit in the housing, (iii) a speaker coupled to the processor unit, and (iv) a reader coupled to the processor unit; and (b) attaching the indicium containing structure including an indicium on the base unit so that the indicium containing structure is attached to the base unit and the vertical surface.

Another embodiment of the invention is directed to an interactive educational toy apparatus comprising: (a) an indicium containing structure including a three-dimensional indicium and a first magnet; and (b) a base unit capable of being attached to a vertical surface, wherein the base unit includes (i) a housing, (ii) a processor unit in the housing, (iii) a memory unit coupled to the processor unit, wherein the memory unit comprises code for audio associated with the indicium, (iv) a speaker coupled to the processor unit, (v) a reader coupled to the processor unit, and (vi) a second magnet adapted to attract the vertical surface so that the base unit is attached to the surface.

These and other embodiments of the invention are described in further detail below.

DETAILED DESCRIPTION

Embodiments of the invention are directed to interactive apparatuses that include a base unit that is capable of being attached to a vertical surface such as a refrigerator door. An indicium containing structure including an attachment element can be attached to the base unit so that the indicium containing structure is also vertically oriented when it is used. Preferably, the attachment element in the indicium containing structure is a first magnet that attracts another magnet in the base unit to hold the base unit and the indicium containing structure together while both are on the refrigerator door.

As used herein, "vertically oriented" includes the disposition of objects such as the base unit and/or indicium containing structures on a vertical surface such as a refrigerator door. "Attached" includes temporary coupling (e.g., magnetic coupling) in a manner whereby the attached objects do not become easily separated (e.g., by gravity). Coupling can be direct (e.g., as with a base unit to a refrigerator door without an intervening structural element) or indirect (e.g., as with an indicium containing structure to a refrigerator door via an intervening base unit).

In one embodiment, the base unit includes a receiving region that can receive one or more of 26 indicium containing structures respectively containing the letters of the alphabet. A window formed by a portion of the base unit may at least partially define the receiving region. In some embodiments, each letter of each indicium containing structure can be three-dimensional and can be formed with or attached to a tile-like back structure. Together, the tile-like back structure and the three-dimensional letter may form an indicium containing structure that is received in the window and the receiving region of the base unit. In preferred embodiments, the indicium containing structure includes a magnet that is capable of being magnetically coupled to another magnet in the base unit.

In the example above, each back structure of each indicium containing structure includes a unique code that identifies the indicium containing structure and corresponding letter (or other indicium) on the indicium containing structure. In some embodiments, the code is a structural code that is embodied by a structural pattern of protrusions and depressions at the back of the indicium containing strucure. A reader in the base unit reads the code when the indicium containing structure is on the base unit. The reader may comprise an array of switches. The structural pattern on the back of the indicium containing structure can activate a predetermined number of binary switches in the array of switches. Once the base unit recognizes which indicium containing structure is attached to the base unit, a speaker in the base unit can sound the letter name and/or phonemes associated with the letter on the indicium containing structure. The sounds including letter names and phonemes may be in the form of a song. U.S. Pat. No. 5,188,533 describes letters sounds and phonemes, and is herein incorporated by reference in its entirety for all purposes.

In some embodiments, placing an indicium containing structure on the base unit triggers speech from the base unit. Alternatively or additionally, pressing the indicium containing structure while it is on the base unit also triggers speech from the base unit. An upwardly biased depressible switch can be in the receiving region of the base unit and can be under the indicium containing structure. The indicium containing structure can be depressed like a pressure sensitive button when it is on the base unit. There may be a "letter-in button" under the indicium containing structure, so that the child does not have to remove the indicium containing structure and insert it again in order to trigger speech repeatedly. The area below the receiving region of the indicicium containing structure can have a 3-position switch for off-low volume-high volume, and a music/song button which sings an ABC song.

As noted above, in some embodiments, the base unit attaches to a vertical surface such as a refrigerator surface or magnetic drawing board (or any magnetically attractable surface) via a magnet in the base unit. There can alternatively or additionally be wall-hanging-holes (e.g., shaped like a key-hole) in the back of the base unit, so that the base unit can hang on a wall using nails or hooks. Various other attachment elements including hook and loop fasteners could alternatively be used.

The indicium containing structures may include two or three-dimensional indicia. A "three-dimensional" indicium includes a z-direction component that is discernable by a user's touch (unlike a two-dimensional letter printed on a piece of paper). The indicia may be of any suitable character or nature. For example, the indicia may include letters, numbers, symbols (e.g., square, circle), animals, parts of animals, vehicles such as trains, geographic entities such as states, insects, etc. Each indicium containing structure may include an individual letter, a combination of letters, an image of a part of an animal, an image of a whole animal, etc. Each of the indicium containing structures can have a magnet built into the back structure and can be free of electrical circuits and electronic circuitry. In some embodiments, the letters on the indicium containing structures are about 36 mm tall, and are stored right on the refrigerator when not in use.

In some embodiments, the indicia on the indicium containing structures include an ordered set of indicia. For example, each indicium containing structure can include one letter in an ordered set of letters. There can be 26 letters of the alphabet associated with 26 indicium containing structures. The front surface of each letter can be printed in different colors (e.g., red, yellow, blue, or green) to also teach children about different colors. It is also possible to add a Braille dot-pattern on each letter so that a child can learn Braille.

As noted above, when one or more indicium containing structures are on the base unit and/or when the one or more indicium containing structures are depressed by the user when they are on the base unit, the base unit may play sounds associated with the indicia on the one or more indicum containing structures. The sounds associated with the indicia may relate to the indicia in any suitable manner. For example, if the indicia are letters, then the sounds of the letter names and phonetic pronunciation(s) of the letters can be produced. These may be in the form of a song in some embodiments. In another example, the indicia may comprise colors and the sounds of the names of the colors may be produced. In other embodiments, if the indicia are parts of animals, then the sounds that are produced may be the names of the animals, or the sounds made by the animals. The sound associated with the indicium may also be speech (or other sound), which indicates that the user has selected the correct or incorrect indicium containing structure (e.g., "that's correct"). The computer code for these and other sounds may be stored in a memory unit in the base unit.

The interactive apparatus can have various play modes. For example, a user can insert an indicium containing structure and can press it to hear a phonics song about that letter. Pressing a separate music button in the base unit causes the base unit to play a song such as the ABC song. The interactive apparatus can teach about letters, phonemes, and letter-object correlation. Other play modes are described below.

Figure 1:
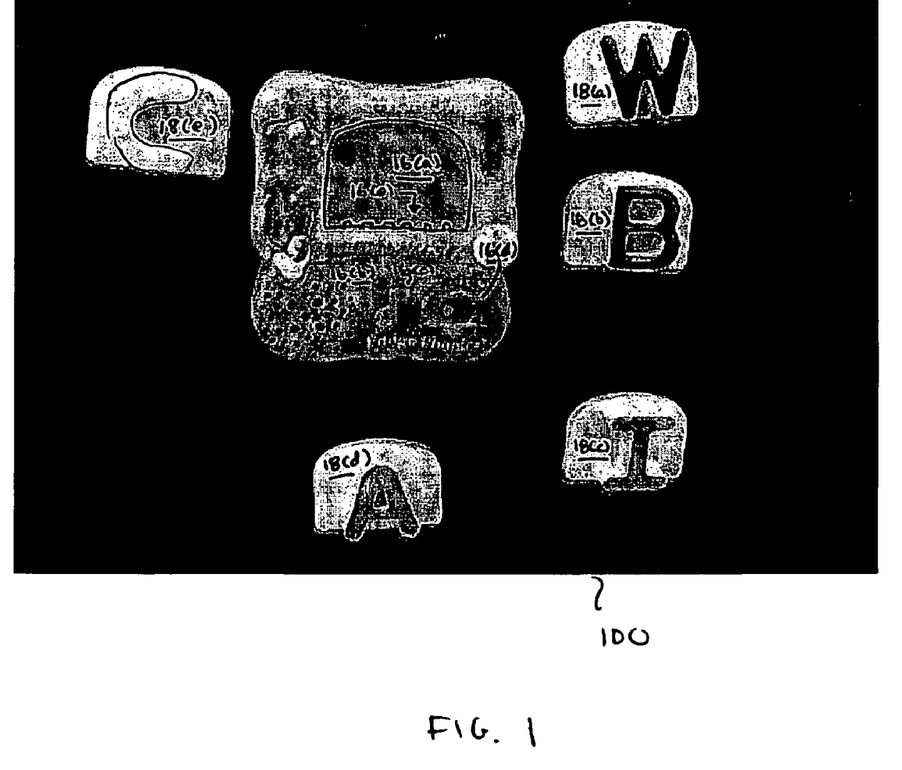
FIG. 1 shows a base unit and a plurality of indicium containing structures on a vertical surface such as a refrigerator door.

FIG. 1 shows a base unit 16 including a window 16(a) defining a receiving region for the indicium containing structure. The window 16(a) is cooperatively structured with each of the indicium containing structures 18(a)–18(e). Both the base unit 16 and the indicium containing structures 18(a)–18(e) are vertically oriented and are attached to a refrigerator door surface 100 with internal magnets. As shown, each indicium containing structure 18(a)–18(e) and the window 16(a) is wider at a bottom portion and narrower at a top portion. This configuration encourages a child to always put the indicium containing structures 18(a)–18(e) into the window 16(a) in the correct orientation. The window 16(*a*) (and/or receiving region) of the base unit 16 and each indicium containing structure 18(*a*)–18(*e*) can be configured so that each is oriented in a single direction. Then, the user cannot place the indicium containing structure on the base unit in the incorrect orientation.

The base unit 16 also includes a speaker 16(*b*), a music button 16(*c*), and an on/off/volume switch 16(*d*). The indicia on the indicium containing structures 18(*a*)–18(*e*) are three-dimensional letters in FIG. 1. Switches 16(*e*) are in the window 16(*a*), and are selectively activated by structural codes on the back structures of the indicium containing structures 18(*a*)–18(*e*). The switches 16(*e*) may form part of a reader that is capable of reading the structural codes and identifying each indicium containing structure 18(*a*)–18(*e*).

The back surface of the receiving region defined by the window 16(*a*) in the base unit 16 may be an upwardly biased depressible switch. When an indicium containing structure is in the window 16(*a*) and is depressed, the upwardly biased switch is also depressed to cause the base unit 16 to produce sound. In the absence of external pressure, no sound is produced in some embodiments. Accordingly, in this embodiment, an indicium containing structure in the window 16(*a*) acts like a button that can be pressed to cause the base unit 16 to produce some audio relating to the indicium on the indicium containing structure.

Figure 2:
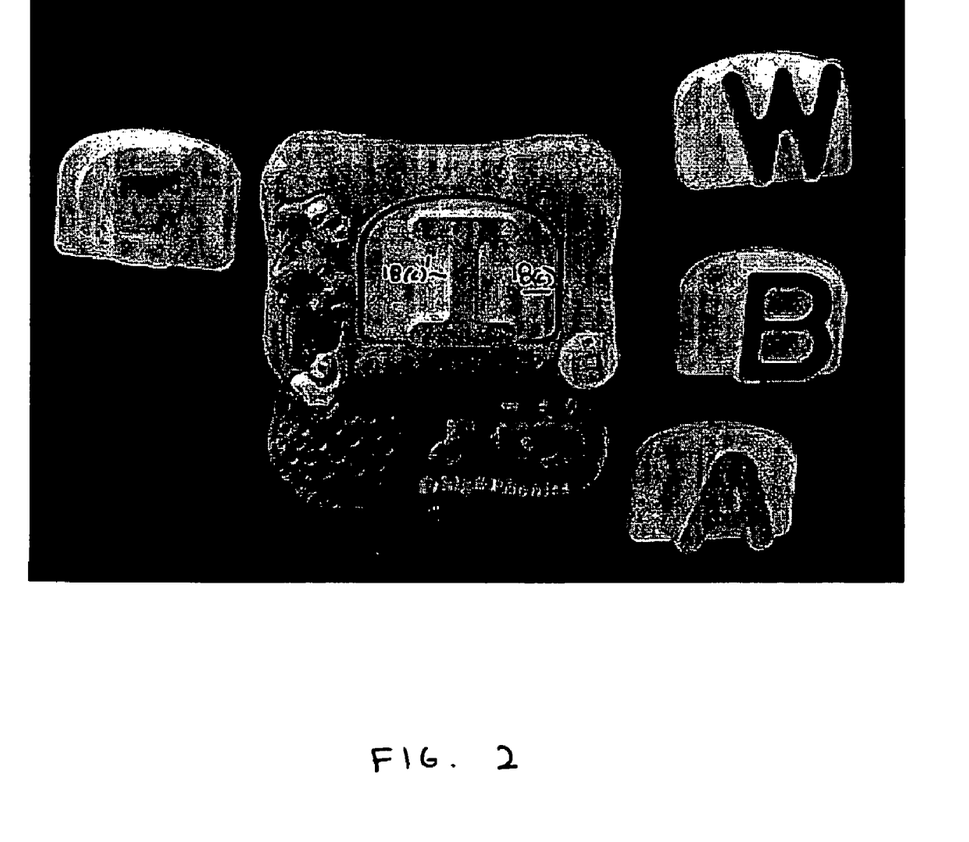
FIG. 2 shows a base unit on a vertical surface and an indicium containing structure on the base unit.

FIG. 2 shows how an indicium containing structure 18(*c*) fits into the window of the base unit 16. As shown in FIG. 2, the indicium containing structure 18(*c*) includes a three-dimensional letter 18(*c*)' integrally formed with a back structure. The back structure of the indicium containing structure 18(*c*) and the window formed in the base unit 16 are shaped so that the indicium containing structure 18(*c*) can be oriented in a single direction when it is on and attached to the base unit 16.

When the indicium containing structure 18(*c*) with the letter I is placed on the base unit 16, it is attached to the base unit 16 via a magnetic coupling force. The user can press the letter I and the base unit 16 may play sounds associated with the letter I "The letter I, I says 'eye' and I says 'ih'".

Although a single indicium containing structure is received in the receiving region of the base unit in the embodiment shown in FIGS. 1–2, it is understood that the base unit would alternatively accommodate two or more indicium containing structures. There can be one window in a base unit to accommodate two or more indicium containing structures, or there may be two or more windows in a base unit that accommodate two or more indicium containing structures. Such base units can be used to help teach children how to spell words, learn phonemes, learn math, learn pattern matching, etc. Examples of other embodiments where multiple indicium containing structures are used with a single base unit are described below.

Figure 3:
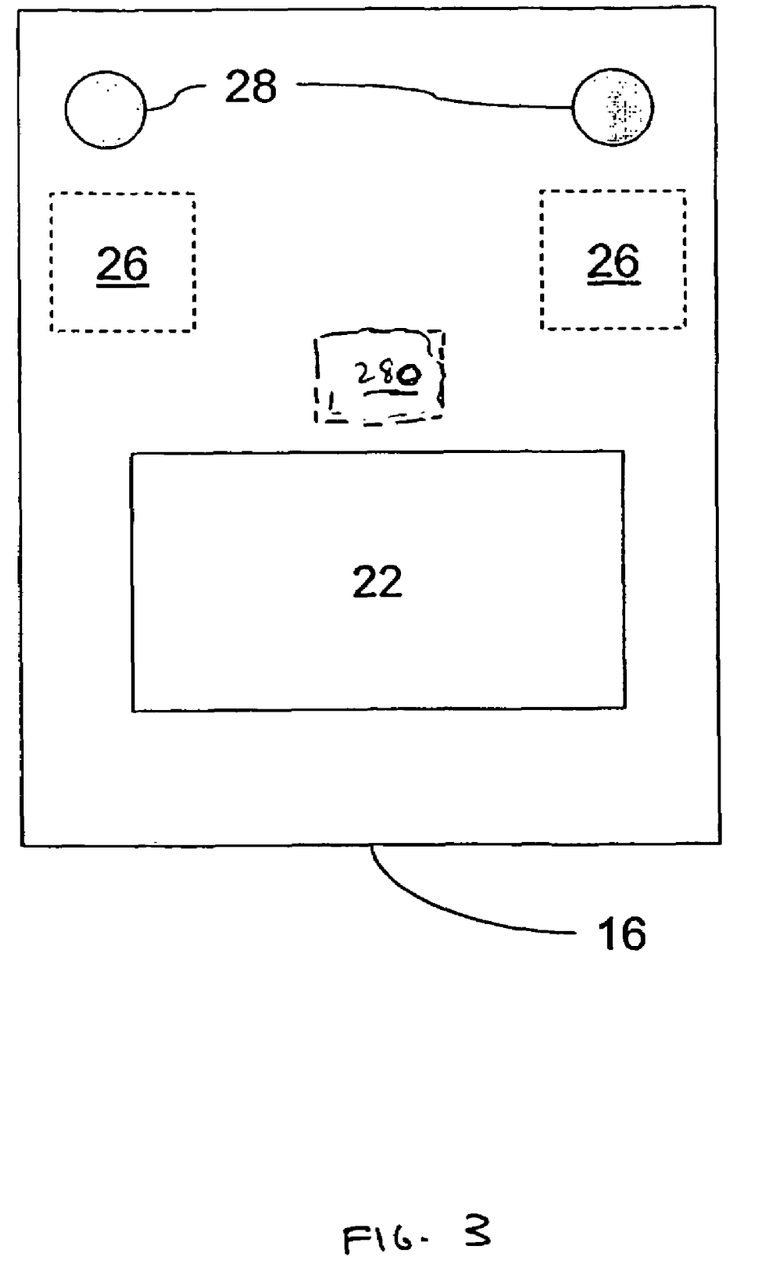
FIG. 3 shows a schematic diagram of the back of a base unit according to an embodiment of the invention.

FIG. 3 shows a back structure of a base unit 16. The back structure includes two holes 28 that can receive nails or other structures. This allows the base unit 16 to hang from a wall. Alternatively or additionally, magnets 26 internal to the base unit 16 and closer to the back surface of the base unit 16 can be included so that the base unit 16 can hang from a vertical surface such as a refrigerator. Another internal magnet 280 closer to the front surface of the base unit 16 may be used to attract the indicium containing structure (not shown in FIG. 3) at the opposite side of the base unit 16. A battery cover door 22 for covering a battery storage compartment is also shown.

Figure 4:
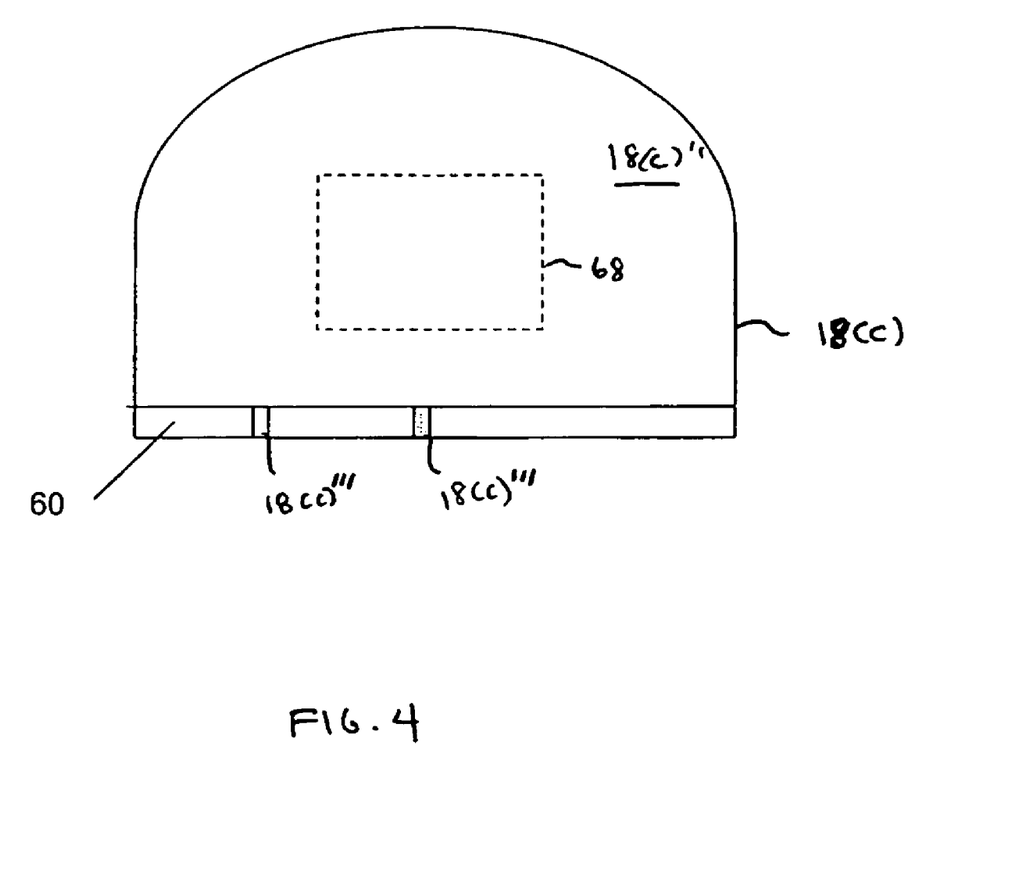
FIG. 4 shows a schematic diagram of a back of an indicium containing structure according to an embodiment of the invention.

FIG. 4 shows a schematic diagram of a back view of an indicium containing structure 18(*c*). It includes an internal magnet 68 (or other attachment element) that can magnetically attract to the magnet 28 in the base unit 16 (see FIG. 4(*a*)). The lower edge of the back structure 18(*c*)" includes a pattern of protrusions 18(*c*)''' and recesses 60 that form a structural pattern and code that is specific to that indicium containing structure 18(*c*). The code can be read with a reader in the base unit, where the reader includes the switches 16(*e*) in the window 16(*a*) of the base unit 16 (see FIG. 1). The structural pattern selectively actives a predetermined number of the switches 16(*e*). This allows the base unit 16 to identify the particular indicium containing structure as well as the indicium on it, so that a processor unit in the base unit 16 can select the appropriate audio from a memory unit.

Since magnets (or other attachment elements) are in both the indicium containing structures 18(*a*)–18(*e*) and the base unit 16, the indicium containing structures 18(*a*)–18(*e*) and the base unit 16 can be securely attached to a vertical surface such as a refrigerator door. The indicium containing structures 18(*a*)–18(*e*) can be used with or without the base unit 16. For example, the indicium containing structures 18(*a*)–18(*e*) can be mixed and matched on the refrigerator door to make words such as "C-A-T". The indicium containing structures 18(*a*)–18(*e*) can also be used to hold up pictures, notes, etc. like normal refrigerator magnets.

Although a reader including a plurality of depressible switches 16(*e*) is described in detail, other types of readers can be used. The readers may use mechanical, electromechanical, optical, or electro-optical means to identify the indicium containing structure. For example, the reader could comprise a plurality of optical sensors and the indicium containing structures can include a pattern of holes that allow a specific pattern of light to pass to the optical sensors.

Figure 5:
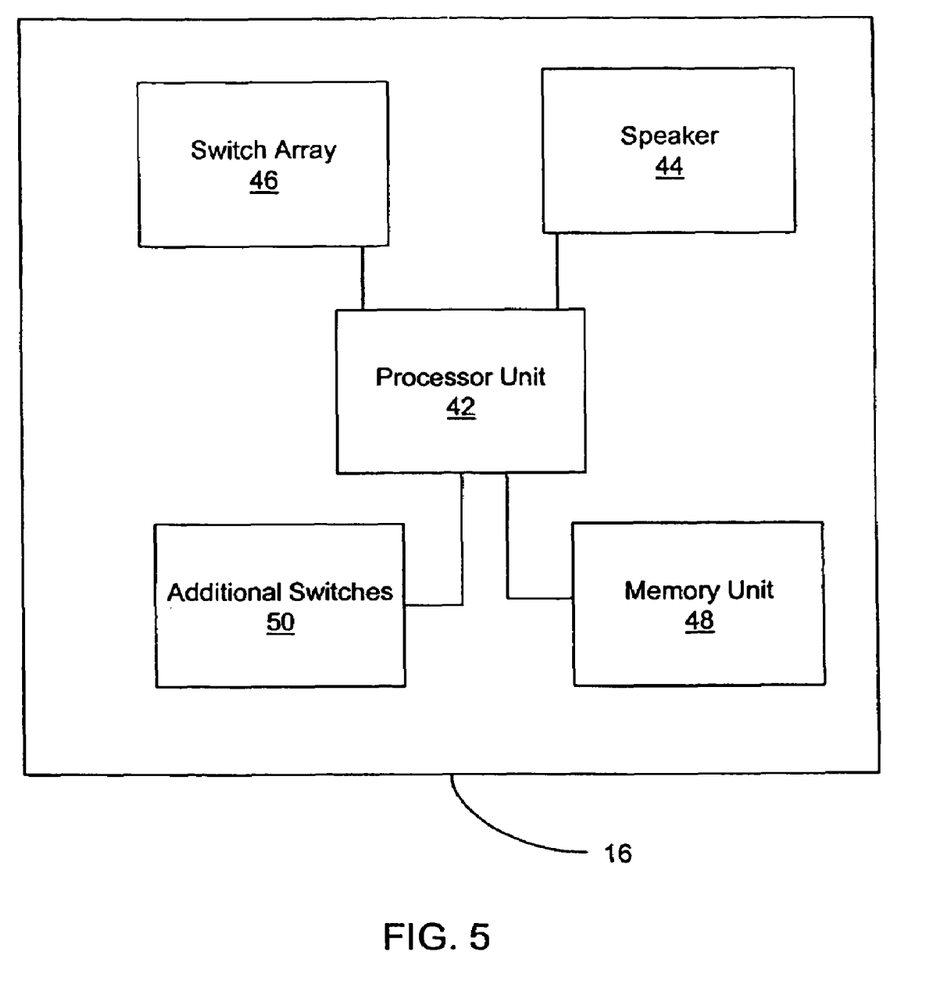
FIG. 5 shows a block diagram of some electronic components that can be used in embodiments of the invention.

FIG. 5 shows a block diagram of some electrical components of a base unit. FIG. 5 shows a processor unit 42 which may include a microprocessor and/or a speech synthesizer, and a memory unit 48 coupled thereto. The processor unit 42 and the memory unit 48 may be on the same or different computer chips. An exemplary processor unit 42 can include a Sunplus SPC251A2 chip. A speaker 44 is coupled to the processor unit 42, and an amplifier and other sound producing circuitry (known to those in the art) may also be included. A 2 inch, 16 ohm, 40 mm, metal frame Mylar™ cone-type speaker can be used as a speaker. A switch array 46 corresponding to a reader may also be coupled to the processor unit 42. Other switches 50 such as volume switches, on-off switches, music switches, etc. may also be coupled to the processor unit 42.

Figure 6:
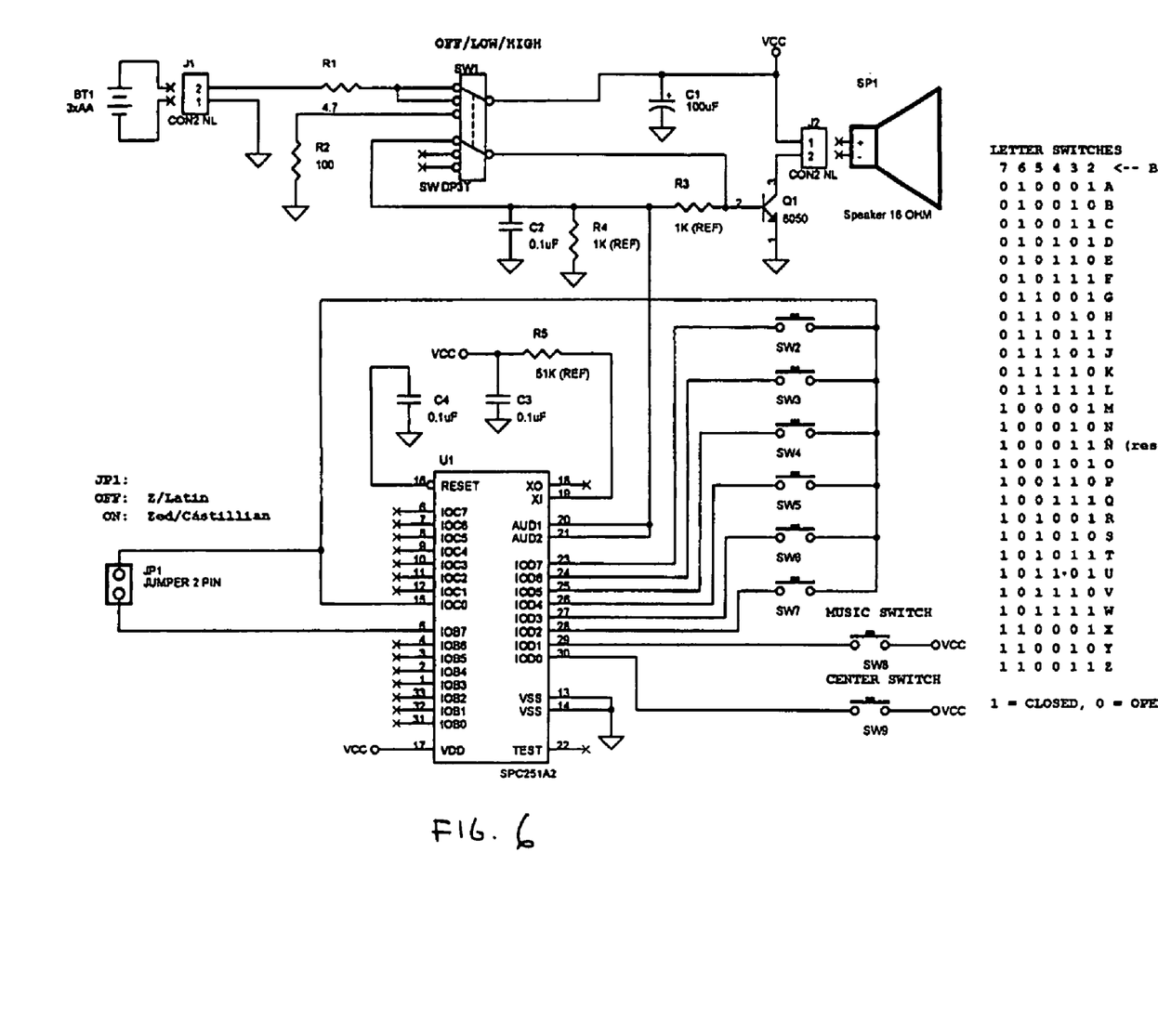
FIG. 6 shows an exemplary circuit diagram according to an embodiment of the invention.

FIG. 6 shows an exemplary circuit diagram for an electronic configuration that can be used in an embodiment of the invention of the type shown in FIGS. 1–2. A number of binary codes for the letters A–Z are shown in FIG. 6. It is understood that other embodiments of the invention could use other circuit configurations and the illustrated circuit diagram is for purposes of illustration.

Figure 7:
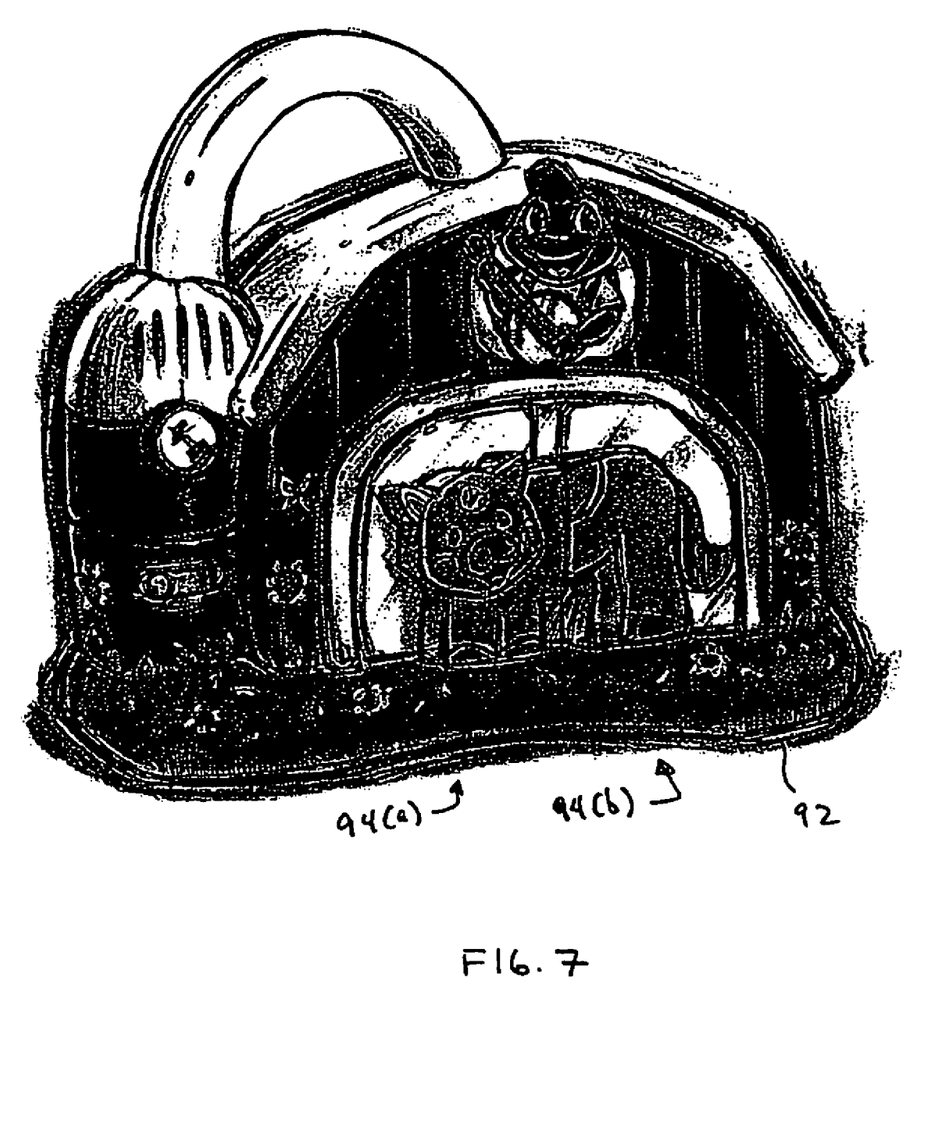
FIG. 7 shows an embodiment of the invention where each indicium containing structure comprises an animal part, and wherein two indicium containing structures are on a base unit that is configured as a barn.
Figure 8:
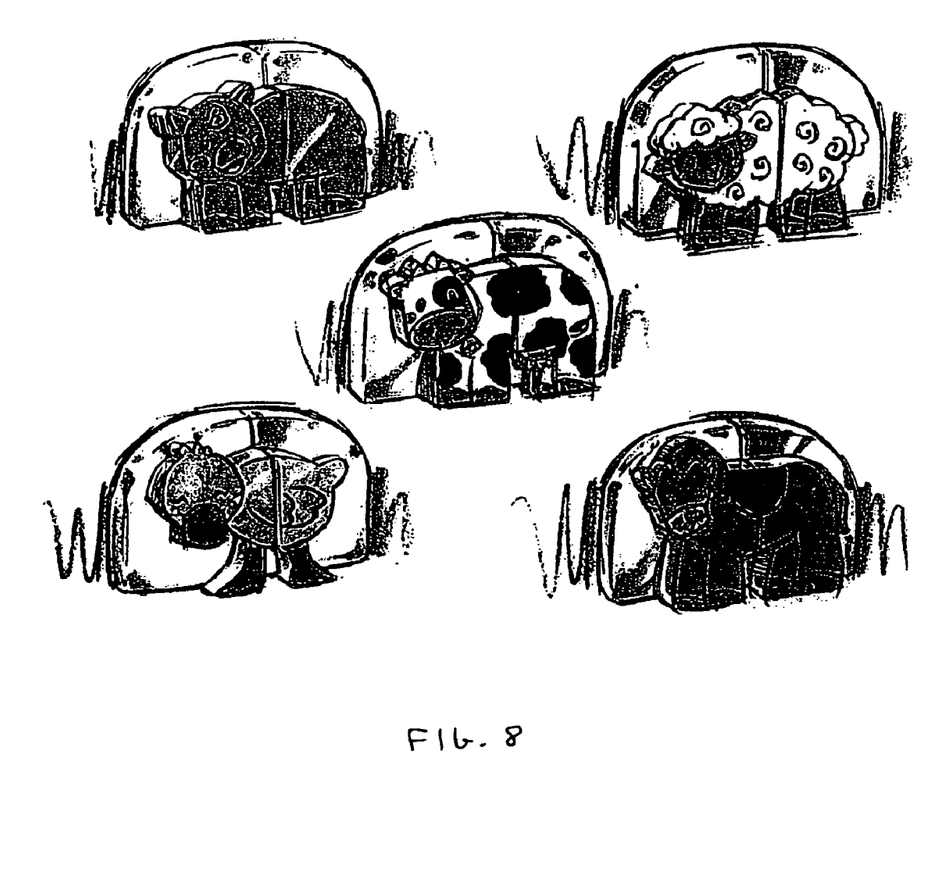
FIG. 8 shows depictions of pairs of indicium containing structures that can be used together with a single base unit.

FIG. 7 shows another embodiment of the invention. FIG. 7 shows a base unit 92 in the form of barn, and indicium containing structures 94(*a*), 94(*b*) in the form of parts of a pig. The parts of the pig may be two or three-dimensional. FIG. 8 shows a set of indicium containing structures that includes pairs of parts of animals, wherein the animals include a pig, sheep, cow, duck, and horse. Any of the pairs can be put into the base unit 92 shown in FIG. 7. The different animals may be different colors to teach children about colors. For example, the cow, pig, duck, sheep, and horse, may be respectively colored purple, pink, yellow, blue, and orange. This embodiment shows that the base unit and the indicium containing structures may correspond to a common theme (e.g., a farm theme).

The base unit 92 and indicium containing structures 94(*a*), 94(*b*) may operate under the same principles as described above. For example, the base unit 92 and the indicium containing structures 94(*a*), 94(*b*) may both contain magnets to allow them to be attached to a vertical surface. However in the embodiment shown in FIGS. 7–8, because combinations of different indicium containing structures are used on the base unit 92, different play patterns present. For example, the base unit 92 can be programmed to provide a reward response if the correct pairs of animal parts are placed in the base unit 92. The base unit 92 can provide different instructional feedback if the wrong animal parts are put together.

The embodiments in FIGS. 7 and 8 show that multiple indicium containing units can be used with a single base unit, and that the indicia associated with the indicium containing units can be symbols, parts of animals, etc., and are not limited to the letters of the alphabet. The illustrated embodiment can be a magnetic puzzle toy to introduce animal names, animal sounds, colors, and textures through silly and creative matching play with a magnetic farmhouse that attaches to the refrigerator or that can be played with on the floor. A child can mix & match 5 different farm animals for up to 25 different combinations. This promotes animal names, animal sounds, matching, colors, and fine motor play.

Referring to FIG. 7, if a child puts the correct indicium containing structures containing the correct animal parts on the base unit 92, then the child is rewarded with appropriate audio. For example, if the child puts the indicium containing structures 94(*a*), 94(*b*) including the pig head and pig tail on the base unit 92, then a reward such as "Wow! You made a pretty pink pig!" and a variation of the "Old MacDonald Had A Farm" song could play. The child may also press down on the indicium containing structures 94(*a*), 94(*b*) to receive appropriate audio. For example, a child can press down on the indicium containing structures 94(*a*), 94(*b*) and audio such as pig sounds, audio relating to pig characteristics, audio relating to a pig's head or a pig's tail, etc. may sound from the base unit 92.

If the child puts in the wrong combination of indicium containing structures, then the base unit 92 could provide the appropriate feedback. For example, if the child puts an indicium containing structure including a cow head and an indicium containing structure including a pig tail on the base unit 92, then some silly audio may be played for the child. For example, if the wrong animal parts are put together, then audio such as "[t]hat's silly!" may play from the base unit 92. Pressing down on the incorrect pair of animal parts on the indicium containing structures may further produce other silly audio (e.g., a giggle) or audio indicating that the incorrect pair of indicium containing structures is on the base unit 92.

In the above-described embodiments, audio feedback is provided after the user has placed one or more indicium containing structures on the base unit. However, in other embodiments, the base unit may be preprogrammed to prompt the user to place a correct indicium containing structure on the base unit. For example, in a quizzing mode, with reference to the previous alphabetic letter example, the base unit 16 may be programmed to ask the user to put the letter C into the base unit. If the user puts the correct indicium containing structure on the base unit, the base unit 16 may play a reward audio segment for the user. If the user puts the wrong indicium containing structure on the base unit, the base unit 16 may be preprogrammed to provide reinforcement audio ("A, you found the letter A") or audio indicating that an incorrect selection has been made ("Try again"). With respect to the examples provided in FIGS. 7 and 8, the base unit 92 may be preprogrammed to play audio such as "can you make a cow?" can play to prompt the child to put the pieces of the cow into the base unit 92. Alternatively, to teach the spelling of three letter words, the base unit may prompt the user to spell "CAT". The child will then have to attach the correct sequence of letters to the base unit. Once attached, any of the individual letters may be depressed to receive some audio related to the depressed letter. Alternatively, combinations of letters can be simultaneously be depressed to produce audio that is related to the combination of depressed letters (e.g., pressing C-A-T simultaneously causes the base unit to say "cat"). Thus, in some embodiments, the interactive toy apparatus may include two or more operational modes including at least two of a declarative mode, a song mode, a quizzing mode, etc. These modes may be preprogrammed into the memory unit of the base unit using programming processes known by those of ordinary skill in the art. A mode selector switch (not shown) may be added to the base units 16, 92 to allow a user to switch between different modes.

Other modifications are also possible. For example, external data cartridges containing code for audio for different sets of indicium containing structures may also be provided. The external data cartridge (or other information transferable storage medium) may insert into a recess in the housing of the base unit to provide the base unit with new and different audio code. For example, an indicium containing structure including the numbers 1–10 and a data cartridge with audio for these indicium containing structures may be used with the base units of the type previously described.

Embodiments of the invention provide a number of advantages. First, the parts of the toy apparatus including the base unit and indicium containing structures include attachment elements such as magnets. These features allow a caregiver to place them on a refrigerator. A child can play with the toy apparatus in the kitchen on the refrigerator door while the caregiver is also in the kitchen performing normal household tasks such as cooking and cleaning. Second, as noted above, family members often spend most of their time in a kitchen. The indicia on the indicium containing structures are vertically oriented and are prominently displayed to children and family members and serve as constant reinforcement mechanism for teaching predetermined subjects. For example, as shown in FIG. 1, the letters of the alphabet can be placed on a refrigerator door and the letters of the alphabet are always visible to a child. Third, the base unit and the indicium containing structures can be used as regular refrigerator magnet structures. They can be used to hold pictures, notes, etc. on a refrigerator door. Fourth, the indicium containing structures can be used independently of the base unit while on the refrigerator door. For example, as noted above, the indicium containing structures including letters can be mixed and matched in suitable combinations on the refrigerator to form words. Fifth, specialized circuit components such as speech chips need not be incorporated into each indicium containing structure. Electronics can be primarily incorporated into the base unit, thus minimizing manufacturing costs.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention. For example, any of the features described with reference to FIGS. 7 and 8 can be combined with the features described with respect to the other Figures without departing from the spirit and scope of the invention.

Also, it should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

All references, patent applications, and patents mentioned above are herein incorporated by reference in their entirety for all purposes. None of them are admitted to be prior art to the presently claimed inventions.

What is claimed is:

1. An interactive educational toy apparatus comprising:
   an indicium containing structure including an indicium, a back structure, and a first attachment element, the indicium containing structure shaped for placement in a single orientation; and
   a base unit capable of being attached to a vertical surface, wherein the base unit includes:
     a housing,
     a receiving region comprising a window and adapted to receive the indicium containing structure, wherein the window is adapted to receive the indicium containing structure in the single orientation,
     a processor unit in the housing,
     a speaker coupled to the processor unit,
     a reader coupled to the processor unit, and
     a second attachment element coupled to the housing,
   wherein the indicium containing structure is capable of being attached to the base unit using the first attachment element and the base unit is capable of being attached to the vertical surface using the second attachment element and wherein the reader is capable of identifying the indicium containing structure based on the back structure in response to the receiving region having received the indicium containing structure.

2. The apparatus of claim I wherein the first attachment element comprises a first magnet, and wherein the second attachment element comprises a second magnet.

3. The apparatus of claim 1 wherein the indicium is three-dimensional.

4. The apparatus of claim 3 wherein the indicium is a letter, a number, a symbol, or a portion of an animal.

5. The apparatus of claim 4 further comprising a plurality of the indicium containing structures, wherein the plurality of indicium containing structures represent the alphabet.

6. The apparatus of claim 1 wherein the indicium containing structure comprises a part of an animal.

7. The apparatus of claim 1 wherein the window is cooperatively structured to receive the back structure of the indicium containing structure.

8. The apparatus of claim 7 wherein the back structure includes a structural code.

9. The apparatus of claim 1 wherein the base unit includes a depressible switch in a receiving region that receives the indicium containing structure, and wherein the depressible switch is upwardly biased in the absence of pressure on the indicium containing structure when the indicium containing structure is attached to the base unit.

10. An interactive educational toy apparatus comprising:
    an indicium containing structure including a three-dimensional indicium, a structural code, and a first magnet, the indicium containing structure shaped for placement in a single orientation; and
    a base unit capable of being attached to a vertical surface, wherein the base unit includes:
      a housing,
      a window adapted to receive the indicium containing structure, wherein the window is adapted to receive the indicium containing structure in the single orientation,
      a processor unit in the housing,
      a memory unit coupled to the processor unit, wherein the memory unit comprises code for audio associated with the indicium,
      a speaker coupled to the processor unit,
      a reader coupled to the processor unit, and
      a second magnet adapted to attract the vertical surface so that the base unit is attached to the surface;
    wherein the reader is capable of identifying the indicium containing structure based on the structural code in response to the indicium containing structure attaching to the base unit by said first magnet.

11. The interactive educational toy apparatus of claim 10 wherein the indicium is one of a sequence of ordered indicia, and wherein the apparatus further comprises a set of indicium containing structures respectively including the ordered sequence of indicia.

12. The interactive educational toy of claim 11 wherein the sequence of ordered indicia is the alphabet or an ordered set of numbers.

13. The interactive educational toy of claim 11 wherein the audio associated with the indicium comprises audio for the name of the indicium and one or more phonetic pronunciations associated with the indicium.

14. An interactive apparatus comprising:
    a housing;
    a receiving region comprising a window and adapted to receive an indicium containing structure that is attachable therewith using a first attachment element, the indicium containing structure comprising a structural code disposed on a back side thereof for identifying said indicium containing structure and shaped for placement in a single orientation, wherein the receiving region is shaped to accept the indicium containing structure in a single orientation;
    a processor unit disposed in the housing;
    a reader coupled to the processor unit, said reader for identifying said indicium containing structure based on said structural code;
    a speaker coupled to the processor unit, said speaker for rendering audio output related to the indicium containing structure; and
    a second attachment element coupled to the housing for attaching said housing to a substantially vertical surface.

15. The apparatus of claim 14 wherein the first attachment element and the second attachment element are magnets.

16. The apparatus of claim 14 wherein the indicium is three-dimensional.

17. The apparatus of claim 16 wherein the indicium is selected from the group comprising: a letter; a number; a symbol; and at least a portion of an animal.

18. The apparatus of claim 14 further comprising a plurality of indicium containing structures, each indicium containing structure operable to be attached within said receiving region.

19. The apparatus of claim 18 wherein said plurality of indicium containing structures represent the alphabet.

20. The apparatus of claim 19 wherein the audio signal comprises a name of a letter of the alphabet represented by the respective indicium containing structure.

21. The apparatus of claim 19 wherein the audio signal comprises a phonetic sound of a letter of the alphabet represented by the respective indicium containing structure.

22. The apparatus of claim 14 wherein the reader is operable to read said structural code.

23. The apparatus of claim 14 further comprising a depressible switch disposed in the receiving region and wherein the depressible switch is activated in response to external pressure applied to the indicium containing structure when the indicium containing structure is attached.

24. The apparatus of claim 23 wherein the processor, in response to activation of the depressible switch, is operable to cause said speaker to render the audio output related to the indicium containing structure.

25. The apparatus of claim 14 wherein the processor is operable to recognize the indicium containing structure when attached within said receiving region and, in response thereto, the processor is further operable to cause said speaker to render the audio signal associated with the indicium containing structure.

26. The apparatus of claim 14 wherein the audio signal is instructional information.

27. The apparatus of claim 14 wherein the receiving region is sized to receive a plurality of indicium containing structures.

28. An interactive apparatus comprising:
a housing operable to be removably attached to a substantially vertical surface with an attachment;
a window adapted to receive an indicium containing structure, wherein the window is adapted to receive the indicium containing structure in a single orientation;
a processor unit disposed within the housing;
a memory unit coupled to the processor unit and comprising code for identifying a plurality of indicium containing structures and for rendering a plurality of audio informations respectively associated with the plurality of indicium containing structures;
a speaker coupled to the processor unit for rendering the audio informations; and
a reader coupled to the processor unit for reading a structural code disposed on an indicium containing structure when said indicium containing structure is removably attached to the housing.

29. The apparatus of claim 28 wherein the plurality of indicium containing structures are a sequence of ordered indicia.

30. The apparatus of claim 29 wherein the sequence of ordered indicia is alphanumeric.

31. The apparatus of claim 28 wherein each of said plurality of audio informations is associated with a respective indicium containing structure and comprises an identification of the respective indicium containing structure and one or more phonetic pronunciations associated with the respective indicium containing structure.

32. The apparatus of claim 28 wherein the processor is operable to recognize a first indicium containing structure when attached to said housing and, in response thereto, the processor is further operable to cause said speaker to render a first audio information associated with the first indicium containing structure.

33. The apparatus of claim 32 wherein the processor is operable to recognize a second indicium containing structure when attached to said housing and, in response thereto, the processor is further operable to cause said speaker to render a second audio information associated with the second indicium containing structure.

34. The apparatus of claim 28 wherein said code uniquely identifies the indicium containing structure.

35. The apparatus of claim 28 wherein said attachment is a magnet and wherein said vertical surface is metallic.

36. The apparatus of claim 28 wherein said memory comprises a removable cartridge insertable in said housing and wherein said removable cartridge comprises audio informations of said plurality of audio informations.

37. The apparatus of claim 28 wherein the plurality of audio informations comprises names of letters of the alphabet represented by the plurality of indicium containing structure.

38. The apparatus of claim 28 wherein the plurality of audio informations comprises phonetic sounds of letters of the alphabet represented by the plurality of indicium containing structure.

39. An interactive apparatus comprising:
a housing;
a receiving region of said housing comprising a window and adapted to receive a predetermined number of indicium containing structures that are removably attachable therewith, the indicium containing structures comprising structural codes for identifying said indicium containing structures, wherein the window is adapted to receive the indicium containing structures in the single orientation;
a processor unit disposed in the housing;
a speaker coupled to the processor unit;
a memory coupled to said processor unit and comprising a plurality of audio informations wherein a different audio information is associated with a set of unique combinations of indicium containing structures;
a reader coupled to the processor unit and for identifying the indicium containing structures based on said structural codes; and
an attachment element coupled to the housing for removably attaching said housing to a substantially vertical surface.

40. An interactive apparatus as described in claim 39 wherein said reader is operable to read said structural code associated with an indicium containing structure when attached to said receiving region.

41. An interactive apparatus as described in claim 39 wherein said processor is operable to identify a first indicium containing structure and a second indicium containing structure when both are attached to said housing and further operable to access said memory to obtain a first audio information associated with a combination of said first and said second indicium containing structures.

42. An interactive apparatus as described in claim 41 wherein said processor is operable cause said speaker to render said first audio information.

43. An interactive apparatus as described in claim 42 wherein said processor is operable to identify a third indicium containing structure and a fourth indicium containing structure when both are attached to said housing and further operable to access said memory to obtain a second audio information associated with a combination of said third and said fourth indicium containing structures.

44. An interactive apparatus as described in claim 43 wherein said processor is operable cause said speaker to render said second audio information.

45. An interactive apparatus as described in claim 39 wherein said predetermined number is two.

46. An interactive apparatus of claim 39 wherein the plurality of audio informations comprises names of letters of the alphabet represented by the plurality of indicium containing structure.

47. An interactive apparatus of claim 39 wherein the plurality of audio informations comprises phonetic sounds of letters of the alphabet represented by the plurality of indicium containing structure.

* * * * *